Sept. 16, 1947.    A. W. LIGER    2,427,565
METAL BONDED ABRASIVE
Filed Sept. 25, 1944

Inventor:
Andrew W. Liger
by Owen W. Kennedy
Attorney.

Patented Sept. 16, 1947

2,427,565

UNITED STATES PATENT OFFICE 2,427,565

METAL BONDED ABRASIVE

Andrew W. Liger, Westboro, Mass., assignor to Bay State Abrasive Products Company, Westboro, Mass., a corporation of Massachusetts Application September 25, 1944, Serial No. 555,678

1 Claim. (Cl. 51—309)

The present invention relates to abrasive articles, such as wheels, tools and the like, and to an improved method for the manufacture of such articles. The invention relates more particularly to metal bonded abrasive articles, and to a method of making such articles by the practice of certain novel steps which result in the production of a superior abrasive article of the above indicated type.

The invention has for its objective the production of a diamond abrasive article which is economical to make and use, and in which article the diamond abrasive particles are firmly bonded and so held as to permit rapid and efficient abrasion without loss of the diamond particles before their useful life has been fully realized. The same objective also applies to articles employing abrasive particles other than diamonds.

Abrasive articles containing diamonds present certain problems in their manufacture not usually encountered with other abrasives. Being harder than other known materials, the potential abrading life of diamond articles is longer; on the other hand, diamond abrasive being much more expensive than other known abrasives must be utilized, when incorporated in an article, in such manner as to take the best advantage of its longer abrading life. Therefore, a prime requisite of any bond that can be advantageously used for the bonding of diamond abrasives and the like is the inherent ability of such bond to hold the hard abrasive particles in place until they become dulled by use, i. e., have reached the end of their useful life.

In the previous manufacture of diamond abrasive articles, bonds of the synthetic resin type, while producing an article with a relatively fast cutting rate, exhibit a tendency to deteriorate rapidly due to the low strength of the bond, thereby allowing valuable diamond particles to be lost before their useful life has been realized, with resulting high costs. Furthermore, vitrified bonds of the ceramic or glass type, while harder than synthetic bonds, possess the disadvantage of probably causing deterioration of the diamond particles by oxidation at the high temperatures necessary for maturing such bonds. While a bond formed from powdered metal will hold the abrasive particles better than a synthetic resin bond, it has been found that wheels employing such a bond have a relatively slow rate of cut and will still not hold the diamond particles for their entire useful life.

According to the present invention, abrasive articles are produced by utilization of a metal bond in which the diamond or other abrasive particles are positioned and held securely in place while the complete bond is built up around the particles. Briefly stated, my improved method resides in the initial production of a relatively thin layer of metal, of less depth than the thickness of the diamond particles to be used, which metal is of such character that the diamond particles may be bedded firmly therein upon heating the metal to a degree approximating its melting point, that is, until the metal is soft but not at its fusion point, with the metal further possessing a degree of hardness, upon cooling, such as to firmly anchor the diamond particles therein. Following this initial positioning of the diamond particles, the article is completed by the electrodeposition of one or more additional layers of metal to build up a bond around the exposed portions of the diamond particles, which completed bond is so hard and strong as to hold the diamond abrasive securely in place and thereby obtain a maximum useful life of the diamond particles under intensive grinding practices.

The above and further advantageous features of the invention will hereinafter more fully appear from the following description considered in connection with the accompanying drawings, in which—

Figure 1:
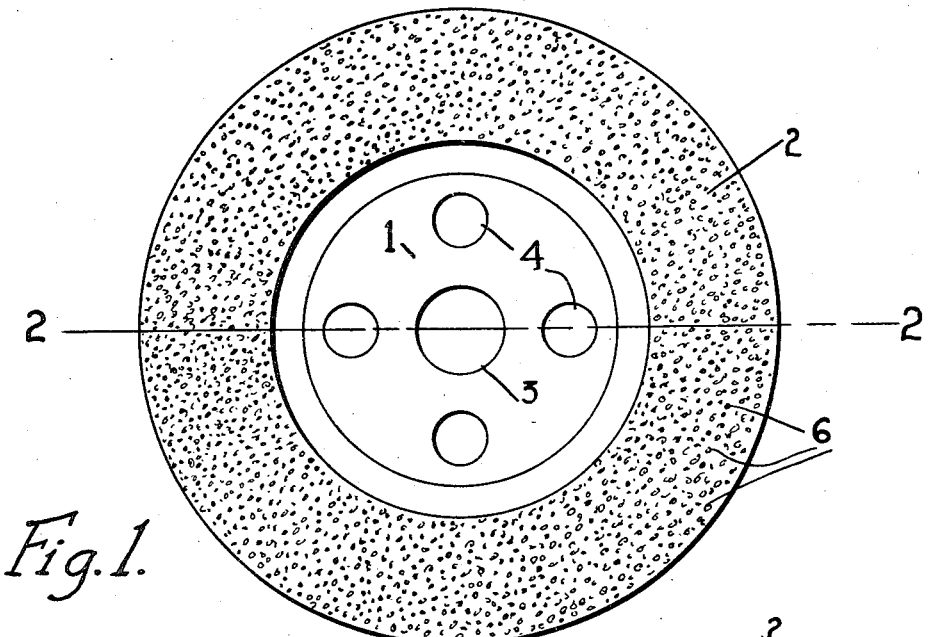
Fig. 1 is a plan view of a metal bonded abrasive wheel embodying the present invention.
Figure 2:
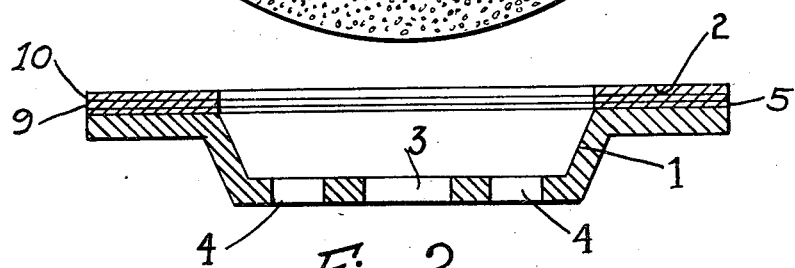
Fig. 2 is a transverse sectional view along the line 2—2 of Fig. 1.

Referring now to the drawings, the invention is shown for purposes of illustration as being embodied in a grinding wheel which consists of a cup-shaped backing 1 for an abrasive surface 2. The backing 1 provides the usual holes 3 and 4 for mounting the wheel to perform a grinding operation. Although the drawings exemplify a cup-shaped wheel, it is not to be considered that my invention is limited to this particular shape, since my method may be applied to produce a very great variety of shapes and sizes.

In the practice of my invention on such a cup-shaped metal backing 1, which in the present case provides an annular surface of the approximate size and shape of the finished article, there is electrodeposited on this surface a layer 5 of metal about one fifth, more or less, of the length of the desired abrasive grain. This layer 5 is of a special metal, and the particular nature and characteristics of this metal are discussed hereafter.

Figure 3:
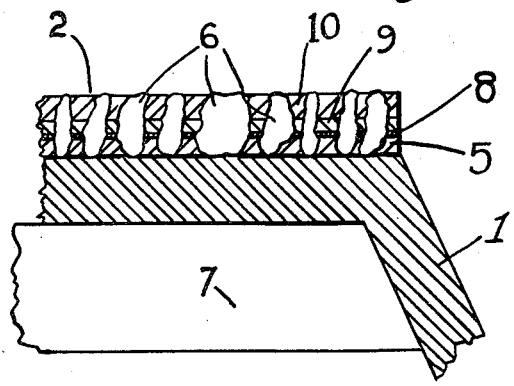
Fig. 3 is a fragmentary sectional view, on a greatly enlarged scale, illustrating the manner of anchoring the abrasive particles and of forming the metal bond around them, in accordance with the practice of my invention.

The layer 5 is uniformly coated with an adhesive medium such as vaseline, for example, and diamond abrasive grains 6 are distributed thereon by any suitable means, such distribution being illustrated in Fig. 3. The assembly is then put in a press, heated to a predetermined temperature at which the sublayer 5 becomes soft. Pressure is then applied and the grains 6 are pressed down through the yielding layer 5 until they contact the backing 1. During the pressing operation a conforming annular support, a section of which is indicated at 7, in Fig. 3, is placed under the rim of the backing 1 to avoid distortion thereof. Upon cooling and hardening of the layer 5, the grains 6 are firmly locked in position within the layer.

The vaseline is now removed by means well known to the art and the backing member 1, with the abrasive grains 6 securely embedded in the layer 5, is placed in a suitable holder and an intermediate layer 8 of copper is electrodeposited thereon. This layer 8 is very thin and is termed a "flash" layer, its purpose being to secure ready adherence of subsequent metal layers by electrodeposition. Brass or silver can be employed for the layer 8 in place of copper.

Without removing the assembly from the holder, the whole is placed in a metal plating bath, and a sub-bond 9 of very hard nickel is electrodeposited thereon to a thickness of about one-fifth of the length of the diamond abrasive grain 6. This electrodeposition of nickel, or iron if desired, may be continued until the layer 9 substantially covers the abrasive grains 6, in which case no further bond would be necessary. I prefer however to halt the deposition of the nickel after about one-fifth of the length of the grain has been covered and then again, without removing the assembly from the holder, the whole is placed in a chromium plating bath and the final bond 10, which is substantially chromium, is built up around the abrasive grains 6, continuing the deposition until the bond 10 nearly covers the diamond particles. Normally the thickness of the final bond 10 is regulated so that there is only about one or two percent of the length of the diamond abrasive grains 6 protruding from the bond. As soon as the final bond is plated, the abrasive wheel is finished and is ready for use.

As previously indicated, the metal of the layer 5 in which the diamond abrasive grains 6 are positioned is of a very particular nature. In general, I have found that this metal must possess the following four characteristics:

1. Be amenable to easy electrodeposition.
2. Have a room temperature yield point of 7500 pounds per square inch, or higher.
3. Possess a Brinell hardness number of preferably less than 10 at a temperature of under 1000° centigrade.
4. Permit easy electrodeposition of extremely adherent subsequent layers of metals, or alloys.

There are relatively few metals or alloys which possess all of the above qualifications for the composition of the layer 5. While zinc and some of the brasses and bronzes may be suitable, I prefer to employ pure cadmium, or an alloy of substantially 1 to 5 percent nickel and the balance substantially cadmium. For example, an alloy of 3 percent nickel and the balance cadmium has a Brinell hardness of 1.8 at 300° centigrade, and it has been found that a hardness of this low value permits easy setting of the diamond particles or grains and the low temperature provides easy handling, with no chance for the diamonds to oxidize.

It is also possible to make the entire backing member 1 from a metal or alloy such as the above, in which case the separate sub-layer 5 would not be needed. Nevertheless, I prefer to employ the electrodeposited layer 5, and it is to be understood that the use of other metals or alloys which answer the above qualifications is within the scope of this invention.

Modern grinding practice puts a demand on the abrasive article to supply high rates of cut, and I have found that an abrasive wheel, particularly a diamond wheel, gives longer service as the bond becomes harder. Because of this fact, I prefer to employ the two layer bonds 9 and 10. The sub-bond 9 is preferably a hard nickel, while the main bond 10 is preferably electrodeposited chromium. The former provides a hard, unyielding base structure for the still harder chromium layer. Under the pressures employed in modern grinding practice, especially in grinding pointed tools, the hard main bond layer helps to resist tool penetration and, consequently, provides much longer life.

I claim:

An abrasive article comprising abrasive grains held firmly in position by a bond consisting of a number of layers of metal, with the abrasive grains being partially embedded in a base layer in which cadmium predominates, with the cadmium layer covered by a very thin layer of copper and the overlying layers being composed of metal having a hardness exceeding that of said base.

ANDREW W. LIGER.

REFERENCES CITED

The following references are of record in the file of this patent:

UNITED STATES PATENTS

| Number | Name | Date |
|---|---|---|
| 1,935,798 | Hopf | Nov. 21, 1933 |
| 2,020,117 | Johnston | Nov. 5, 1935 |
| 2,334,494 | Keeleric | Nov. 16, 1943 |
| 1,524,218 | Smith et al. | Jan. 27, 1925 |
| Re. 22,373 | Benner et al. | Sept. 14, 1943 |
| 2,361,492 | Pare | Oct. 31, 1944 |
| 150,862 | Husbands, Jr. | May 12, 1874 |
| 519,475 | Marquart | May 8, 1894 |

FOREIGN PATENTS

| Number | Country | Date |
|---|---|---|
| 398,073 | Great Britain | Sept. 7, 1933 |
| 101,940 | Sweden | July 1, 1941 |

OTHER REFERENCES

The Metal Industry, October 25, 1929, page 392. (Copy in 204–50.)